United States Patent Office 3,412,179
Patented Nov. 19, 1968

---

3,412,179
POLYMERS OF ACRYLYL PERFLUORO-HYDROXAMATES
Eduard K. Kleiner, New York, N.Y., assignor to Geigy Chemical Corporation, Greenburgh, N.Y., a corporation of Delaware
No Drawing. Filed June 27, 1966, Ser. No. 560,869
19 Claims. (Cl. 260—900)

ABSTRACT OF THE DISCLOSURE

Polymers of acrylyl perfluorohydroxamate monomer compounds of the formula:

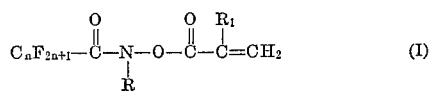

(I)

wherein $n$ is a whole number of from 1 to 18, R is hydrogen or alkyl of from 1 to 6 carbon atoms and $R_1$ is hydrogen or methyl; have valuable soil repellent properties. The polymers are used in oil and water repellent finishes useful in treating materials such as textiles, paper, leather, and painted wooden and metallic surfaces. Both homopolymers of the hydroxamates and copolymers thereof with at least one other ethylenically unsaturated comonomer are contemplated. Preferred are polymers of methacrylyl perfluorooctanoyl hydroxamate, methacrylyl N-methyl - perfluorooctanoylhydroxamate, and methacrylyl perfluorobutyrylhydroxamate, especially copolymers thereof with, for example, octyl methacrylate.

---

This invention relates to polymers of fluorine-containing monomers with useful soil repellent properties. More particularly it relates to homopolymers and copolymers of acrylyl perfluorohydroxamates. The new polymers provide oil- and water-repellent finishes useful to treat materials such as textiles, paper, leather, painted wooden and metallic surfaces, and the like.

The perfluorinated polymers contemplated by the instant invention are those made by polymerizing compounds of Formula I:

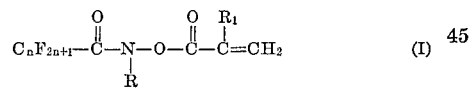

(I)

wherein $n$ is a whole number of from 1 to 18, R is hydrogen or alkyl of from 1 to 6 carbon atoms and $R_1$ is hydrogen or methyl. The $C_nF_{2n+1}$ radical may be straight or branched chain. Where used herein, "acrylyl" contemplates as well "methacrylyl." The term "polymers" includes homopolymers and copolymers.

Special mention is made of an especially valuable embodiment of this invention. This comprises polymers of compunds of the formula above wherein $n$ is a whole number of from 1 to 18, preferably from 7 to 15, and R and $R_1$ are hydrogen or methyl.

Especially useful as embodiments of this invention and polymers of the compounds methacrylyl perfluorooctanoylhydroxamate, a compound of the above formula in which the straight chain $C_nF_{2n+1}$ radical has a value for $n$ of 7, R is hydrogen and $R_1$ is methyl; methacrylyl N-methylperfluorooctanoylhydroxamate, a compound of the formula above wherein the straight chain $C_nF_{2n+1}$ radical has a value for $n$ of 7, R and $R_1$ are methyl; and methacrylyl perfluorobutyrylhydroxamate, a compound of the formula above wherein the straight chain $C_nF_{2n+1}$ radical has a value for $n$ of 3, R is hydrogen and $R_1$ is methyl.

The new polymers are characterized by excellent resistance to hydrolysis. This provides substantial advantage in their use as fabric finishes, when compared to finishes previously used for the purpose of soil repellency. Fabrics finished with polymers made from the instant monomers retain their soil-repellent properties after repeated washings.

Also contemplated are copolymers of compounds of Formula I above with comonomers which contain an ethylenic linkage. The acrylyl perfluorohydroxamates form copolymers with many comonomers. Illustrative of the said comonomers which contain an ethylenic linkage are ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, alpha-chloro acrylic acid and alkyl esters thereof, methacrylonitrile, vinyl carbazole, vinyl pyrrolidone, vinyl pyridine, vinyl alkyl ethers, vinyl alkyl ketones, butadiene, fluorinated butadienes, chloroprene, fluoroprene, isoprene, and the like. Especially useful to form soil-repellent finishes are copolymers of methacrylyl perfluorooctanoylhydroxamate and esters of acrylic and methacrylic acids derived from alcohols containing from about 1 to about 16 carbon atoms, such as lauryl methacrylate, octyl methacylate, hexyl acrylate, ethyl acrylate, 2-ethylhexyl acrylate, and the like.

Since these novel fluoropolymers and copolymers find substantial use as textile finishes, it is an advantage to include in the monomer mixture from about 0.2 to about 5% by weight of a reactive acrylic, which permits crosslinking either by heat or crosslinking agents. Such reactive fluorocopolymers give textile finishes with superior resistance to washing, dry cleaning, scrubbing, abrasion and crushing, both wet and dry, and also a better durability of the oil and water repellency.

Illustrative of such reactive comonomers are those derivatives of acrylic or methacrylic acid exhibiting a moiety which, as a pendant group on the resultant interpolymer, is capable of reacting with another compound so as to effect crosslinking. Such groups are well known and may be hydroxy as in the case of a hydroxyalkyl acrylate, carboxy as in the case of acrylic or methacrylic acid, epoxy as in the case of glycidyl methacrylate, methylolamido as in the case of N-methylolacrylamide or alkoxymethylamido as in the case of an etherified methylolacrylamide. Also useful are acrylamide and methacrylamide.

This invention also contemplates in one of its embodiments polymers havng a skeletal chain consisting essentially of repeating units represented by the formula:

$$C_nF_{2n+1}-\overset{O}{\overset{\|}{C}}-N-O-\overset{O}{\overset{\|}{C}}-\overset{|}{C}-R_1$$
$$\phantom{xxxxxxxx}R\phantom{xxxx}CH_2$$

wherein N, R and $R_1$ are as above defined for Formula I.

The perfluorinated monomeric compounds can be prepared from readily available materials according to the reaction outlined in the following sequence:

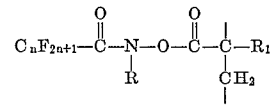

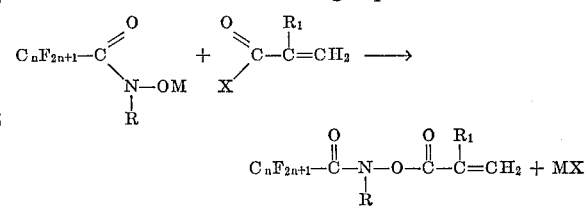

wherein $n$, R and $R_1$ are as above defined, and M is hydrogen or a replaceable metallic cation from groups I and II of the periodic table such as sodium, potassium, calcium, magnesium, mercury, and the like and X is halogen, such as chlorine or bromine. The condensation is effected merely by bringing together the perfluorohydroxamic acid salt and the acrylyl or substituted acrylyl halide. It is preferred to conduct the reaction in a solvent, suitably dry acetonitrile, and to heat the mixture at reflux for a short time to insure highest yields. The product is recovered by filtering off the by-product salt and evaporating the solvent, if any is used. The product, which remains as a residue, can be purified, if desired, by recrystallization from a chlorinated hydrocarbon solvent, such as chloroform or carbon tetrachloride, or it can be distilled in the presence of an inhibitor such as hydroquinone.

Alternatively, the acrylyl perfluorohydroxamates can be prepared by treating an appropriately-substituted perfluorohydroxamic acid with an acrylyl or methacrylyl halide in the presence of an acid binding agent, such as a base, like quinoline, which is capable of binding the elements of hydrogen halide eliminated as a by-product.

Alternatively and conveniently, the compounds used to prepare the polymers of this invention wherein R is alkyl of up to 6 carbon atoms can be prepared by alkylation of the compounds wherein R is hydrogen. Thus, for example, the compounds wherein R is hydrogen are converted to a salt, such as the potassium salt, by treatment with a base such as potassium hydroxide. The said salt is reacted with an alkylating agent, such as an alkyl halide or a dialkyl sulfate, until the reaction is substantially complete and the alkylated product is recovered by separating the by-product salt, then isolating the residue, purifying it, if necessary, by crystallization or distillation, as described above and exemplified hereinafter.

The starting materials for the monomeric compounds are readily available or can be prepared by techniques within the capabilities of those skilled in the art. Perfluorohydroxamic acids and salts, for example, can be prepared by simple modifications of the procedures reviewed by Yale in Chem. Reviews, 33, 209 (1943). The acrylyl and methacrylyl halides are items of commerce or can be obtained, for example, by the procedures described in the literature of the art to which the present invention pertains.

The starting materials which are used in this invention are perfluorohydroxamic acids or metal derivatives thereof and can be prepared, for example, by mixing an appropriate ester or acyl halide, such as the chloride, of a perfluoroalkane carboxylic acid with an appropriately-substituted hydroxylamine salt, such as hydroxylamine hydrochloride or an alkylhydroxylamine hydrochloride, and the like, in a solution of dry alcohol, such as methanol and in the presence of a metal hydroxide, such as sodium hydroxide or potassium hydroxide. The mixture is stirred until the replacement of the alkoxy group in the ester by the hydroxylamino group is substantially complete, which requires from about 30 minutes to about 4 days, depending on the reactivity of the reagents and the temperature of the mixture. The starting material is recovered by filtering off the by-product salt, then adding enough chloroform to precipitate the metal derivative of perfluoroalkylhydroxamic acid from solution. If the free acid is desired, the salt is treated with a strong acid such as hydrochloric acid and the free acid precipitates and is recovered by filtration.

The instant homopolymers and copolymers are formed by standard procedures well known to those skilled in the art. Polymerization occurs readily by bulk, solution or emulsion techniques, employing free radical-forming catalysts. The ratios of percentages by weight of the respective monomers used can vary widely in the formation of useful copolymers. For example, charge ratios of the acrylyl perfluorohydroxamate monomers may vary from 1 to 99% by weight of the total monomer mixture. It is preferred however, for the best balance of economy and ultimate properties, to use between about 40 and about 90% by weight of the instant monomers based on the total monomer mixture.

The copolymers broadly contemplated can have at least three structural variations: they can be homogeneous copolymers; or they can exist in the form of segmented (or heterogeneous) copolymers; or they can comprise physical blends of acrylyl perfluorohydroxamate homopolymers or copolymers blended with a non-fluorine containing homo- or co-polymer. The term "copolymer" used herein broadly contemplates these above-mentioned variations, as well as all copolymers of acrylyl perfluorohydroxamates obvious to those skilled in the art. Exemplification for the preparation of homogeneous copolymers is given hereinafter. Suitable techniques applicable to the preparation of segmented or heterogeneous copolymers within the scope of this invention are exemplified in U.S. 3,068,187. The preparation of copolymer blends within the scope of this invention can be achieved employing appropriate monomers and the detailed descriptions in Belgian Patents Nos. 635,437 and 645,697. In some instances copolymers with superior repellencies are obtained as the result of application of the latter two techniques.

In general all polymerization techniques and procedures as to kind and amount of catalyst, emulsifiers, chain regulators, solvents, and the like are well within the capabilities of those skilled in the art to which this invention pertains.

Films of the homopolymers and copolymers can be prepared either by casting from solvent solutions or from aqueous emulsions. Especially useful as solvents are fluorinated liquids, and special mention is made of $\alpha,\alpha,\alpha$-trifluorotoluene, also known as benzotrifluoride, hexafluoroxylene and mixtures of these with ethyl acetate or acetone and the like.

It is also uniquely advantageous, especially in the preparation of fabric finishes, to use blends of the instant homopolymers with other homopolymers such as polyalkyl acrylates and polyalkyl methacrylates, illustrative of which is poly-n-octyl methacrylate. Since the homopolymers of certain of the acrylyl perfluorohydroxamates have a tendency to be brittle and high melting, blending them with, for example, from about 20 to about 97% by weight of a homopolymer such as poly-n-octyl methacrylate provides useful compositions which, surprisingly retain high repellency ratings even though the relative amount of polymer of the instant monomers is quite low.

The following procedures are illustrative of the preparation of compounds useful to prepare the polymers of this invention:

Procedure A.—Methacrylyl perfluorooctanoylhydroxamate

Potassium perfluorooctanoylhydroxamate (prepared by treating methyl perfluorooctanoate with hydroxylamine hydrochloride in the presence of potassium hydroxide), 23.35 g., 0.05 mole, is suspended in 150 ml. of dry acetonitrile. A solution of methacrylyl chloride, 7.31 g., 0.07 mole, in 20 ml. of dry acetonitrile is added dropwise to the vigorously stirred mixture. The reaction is stirred for an additional 90 minutes at 25° C. and then refluxed for 15 minutes. The by-product potassium chloride is removed by filtration and the solvent is removed by distillation in a vacuum. The residue is recrystallized from a mixture of equal parts of chloroform and carbon tetrachloride. There is obtained 19.1 g. of product, m.p., 62–64° C.

Procedure B.—Methacrylyl perfluorobutyrylhydroxamate

A mixture of potassium perfluorobutyrylhydroxamate, 0.12 mole, and methacrylyl chloride, 0.12 mole, suspended in 120 ml. of dry acetonitrile is stirred at 25° C. for four hours. The reaction mixture then is filtered and the solvent is removed from the filtrate by distillation in a vacuum. A sample of the product polymerized spontaneously when left overnight at 25° C. A quick distillation of the filtrate in the presence of hydroquinone as polymerization inhibitor affords 12.2 g. of product, B.P. 65–66° C. at 0.05 mm. Hg pressure.

Procedure C.—Methacrylyl N-methylperfluorooctanoylhydroxamate

The potassium salt of methacrylyl perfluorooctanoylhydroxamate is prepared by neutralizing a solution of methacrylyl perfluorooctanoylhydroxamate in dioxane with an equivalent amount of potassium hydroxide dissolved in methanol. The salt, which precipitates immediately, is filtered and dried. A mixture of the potassium salt, 0.022 mole, suspended in 50 ml. of dry acetonitrile, and 0.026 mole of dimethyl sulfate, is allowed to reflux for 1 hour. After cooling to room temperature, the mixture is filtered and the solvent is removed from the filtrate by distillation in a vacuum. Distillation of the residue affords 6.7 g. of product, B.P. 79.5–80.5° C. at 0.05 mm. Hg pressure.

Procedure D

The procedure of Procedure A is repeated with stoichiometrically-equivalent amounts of perfluorohydroxamic acid derivatives and acrylyl and methacrylyl halides. The following substituted-acrylyl perfluorohydroxamates are obtained:

$$C_nF_{2n+1}-\overset{O}{\overset{\|}{C}}-N-O-\overset{O}{\overset{\|}{C}}-\overset{R_1}{\overset{|}{C}}=CH_2$$
$$\overset{|}{R}$$

| $C_nF_{2n+1}$ | R | $R_1$ |
|---|---|---|
| $CF_3$ | H | $CH_3$ |
| $(CF_3)_2CF$ | $CH_3$ | H |
| $CF_3(CF_2)_{17}$ | $(CH_3)_2CH$ | $CH_3$ |
| $CF_3(CF_2)_{11}$ | H | $CH_3$ |
| $CF_3(CF_2)_6$ | $CH_3$ | $CH_3$ |
| $CF_3(CF_2)_{10}$ | $(CH_3)_3C$ | $CH_3$ |
| $CF_3(CF_2)_{10}$ | $CH_3(CH_2)_5$ | H |
| $CF_3(CF_2)_{10}$ | $CH_3CH_2$ | $CH_3$ |
| $CF_3(CF_2)_6$ | $CH_3$ | H |
| $(CF_3)_2CF(CF_2)_6$ | H | $CH_3$ |
| $(CF_3)_2CF[CF_2CF(CF_3)]_4$ | $CH_3$ | $CH_3$ |
| $CF_3[(CF_2CF(CF_3)]_5$ | H | $CH_3$ |

The following examples are illustrative of the polymers of the instant invention. They are provided for the purposes of exemplification and are not to be construed to limit the scope of the claims in any manner.

Example I.—Poly(methacrylyl perfluorooctanoylhydroxamate)

Methacrylyl perfluorooctanoylhydroxamate (prepared by Procedure A), 10 g. and 0.2 g. of azobisisobutyronitrile are dissolved in 20 g. of ethyl acetate and the solution is sealed in an ampul under nitrogen. After polymerizing at 80° C. for 15 hours, the ampul is opened and the precipitated polymer is dissolved in 40 g. of a mixture of benzotrifluoride and hexafluoroxylene (1:1) and precipitated by pouring the polymer solution dropwise under vigorous stirring into 800 ml. of methanol. The product is collected by filtration and is dried. The white polymer which has a Tg value of +140° C. and a m.p. of 175° C., determined by differential thermal analysis, is dissolved in a mixture of benzotrifluoride, hexafluoroxylene, ethyl acetate (1:1:1) to provide a 2% concentration by weight and the solution is applied to cotton and to wool fabrics. With 2% by weight of the polymer on the fabric, the oil and water-repellency are evaluated by the 3-M-Oil test and by the AATCC-Water-Spray Test, respectively. On cotton it had an oil repellency rating of 110; and on wool, a rating of 120. On cotton it had a water repellency rating of 100 and on wool a rating of 90.

The AATCC-Water-Spray Test rating is determined according to Standard Test Method 22–1966 of the American Association of Textile Chemists and Colorists, XXXVII, 1961, p. 152 (also designated ASTM D 583–58). Oil repellency is measured by the 3-M-Oil test procedure of Grajek and Peterson, Textile Research Journal, April 1962, p. 323.

Example II.—Copolymer of methacrylyl perfluorooctanoylhydroxamate and blends thereof Methacrylyl perfluorooctanolylhydroxamate, 9 g.; n-octyl methacrylate, 0.8 g.; 2-hydroxypropyl methacrylate, 0.2 g.; azobisisobutyronitrile, 0.2 g.; and n-lauryl mercaptan, 0.1 g.; are dissolved in 20 g. of a 1:1 mixture of hexafluoroxylene and ethyl acetate and the solution is sealed in an ampul under nitrogen. After polymerizing at 70° for 15 hours, the ampul is opened and the viscous solution is diluted with another 20 g. of the hexafluoroxylene-ethyl-acetate mixture and poured dropwise under stirring into 1000 ml. of hexane. The precipitated polymer is dried and a 2% solution in ethyl acetate-hexafluoroxylene is prepared. Then a 2% solution of a copolymer of 98% n-octyl methacrylate and 2% methacrylic acid in trifluorotoluene is prepared. From these two polymer solutions, physical blends with different ratios are prepared and then applied to cotton and wool. The cotton and wool fabrics are dried, cured for 2 minutes at 350° F. and then evaluated as described in Example I. The following repellency ratings are obtained:

| Copolymer-Blends | | | Repellency Ratings | |
|---|---|---|---|---|
| Percent by wt. Fluoro-Copolymer | Percent by wt. Octylmethacrylate Copolymer | Fabric | 3-M-Oil test | AATCC Water Spray-Test |
| 100 | ---- | C | 100 | 100 |
|  |  | W | 110 | 90 |
| 60 | 40 | C | 100 | 90 |
|  |  | W | 110 | 80 |
| 40 | 60 | C | 100 | 80 |
|  |  | W | 100 | 80 |
| 30 | 70 | C | 90 | 80 |
|  |  | W | 90 | 70 |
| 20 | 80 | C | 80 | 70 |
|  |  | W | 70 | 70 |
| 10 | 90 | C | 60 | 50 |
|  |  | W | 50 | 50 |

2% of the Polymerblend on all fabric samples.
C=Cotton.  W=Wool.

These results show the discovery of extending the instant fluoropolymers by blending with other homopolymers, without losing the repellency level.

Example III.—Copolymer of methacrylyl perfluorooctanolylhydroxamate

To 100 g. of the 2% fluorocopolymer solution described in Example II, 0.05 g. of p-toluenesulfonic acid is added and cotton and wool is treated with this solution. After air drying, the fabrics are cured for 2 minutes at 350° and the oil- and water-repellency are evaluated. Then the fabrics are submitted to 3 AATCC No. 3A washes and reevaluated. As the following results indicate, no significant hydrolysis occurs and substantially the same repellency level is retained.

| Copolymer | | Repellency Ratings | | |
|---|---|---|---|---|
|  | Fabric [1] | 3-M-Oil test | AATCC water Spray-Test | |
| Before No. 3A wash test | Cotton | 100 | 100 | |
|  | Wool | 110 | 90 | |
| After 3 No. 3A wash tests | Cotton | 90 | 90 | |
|  | Wool | 90 | 80 | |

[1] 2% copolymer on fabric.

Example IV.—Copolymer of methacrylyl perfluorooctanoylhydroxamate and n-octyl methacrylate Methacrylyl perfluorooctanoylhydroxamate, 5 g., n-octyl methacrylate, 5 g., and 0.2 g. of azobisisobutyronitrile are dissolved in 10 g. of ethyl acetate and the solution is sealed in an ampul under nitrogen. After polymerizing at 80° for 15 hours, the ampul is opened and the highly viscous solution is diluted with 40 g. of ethyl acetate and then dropwise poured into 1 liter of methanol, with vigorous stirring. The white, precipitated copolymer has according to elemental analysis a copolymer composition of 54.5% of the fluoromonomer and 45.5% of n-octyl methacrylate, a Tg-value of 45° C. and an M.P. of 58° C., determined by differential thermal analysis. A 2% by weight solution of the copolymer in benzotrifluoride is prepared and equal moles of 1 normal methanolic potassium hydroxide solution, based on the ester linkages in the copolymer is added. After 45 hours at 50° C., only 13% of the potassium hydroxide is used up (determined by titration with 0.1 normal hydrochloric acid), indicating excellent hydrolytical stability for the copolymer. A homopolymer of n-octyl-methacrylate, on the other hand, uses up 11% of the potassium hydroxide under the same condition, indicating essentially equivalent hydrolytic stability.

Example V.—Poly(methacrylyl perfluorobutyrylhydroxamate)

Methacrylyl perfluorobutyrylhydroxamate (prepared by procedure B), 10 g., and 0.2 g. of azobisisobutyronitrile are dissolved in 10 g. of ethyl acetate and the solution is sealed in an ampul under nitrogen. After polymerizing for 15 hours at 80°, the ampul is opened, and the very viscous solution is diluted with 20 g. of ethyl acetate. This polymer solution is added dropwise to 600 ml. of hexane, with vigorous stirring. The precipitated polymer is dried and a 2% by weight solution in ethyl acetate is prepared and applied to cotton and to wool. 2% of the polymer on the fabrics afford the following repellency ratings.

| Fabric | 3-M-Oil Test | AATCC Water Spray-Test |
|---|---|---|
| Cotton | 70 | 50 |
| Wool | 70 | 50 |

Example VI.—Reactive copolymer of methacrylylperfluorobutyrylhydroxamate and glycidylmethacrylate Methacrylyl perfluorobutyrylhydroxamate, 9.8 g., glycidyl methacrylate, 0.2 g., and azobisisobutyronitrile, 0.2 g., are dissolved in 10 g. of ethyl acetate and the solution is sealed under nitrogen. After polymerizing for 15 hours at 60° C., the ampul is opened and the highly viscous polymer solution is diluted with 40 g. of ethyl acetate. This polymer solution is added dropwise to 1000 ml. of hexane under vigorous stirring. The precipitated polymer is dried and the following polymer solution is prepared:

|  | Grams |
|---|---|
| Copolymer | 5.0 |
| p-Toluenesulfonic acid | 0.1 |
| Ethyl acetate | 245.0 |

Cotton and wool are treated with this solution, then the fabrics are air dried, then cured for two minutes at 350° F. The following repellency ratings are obtained:

| Fabric | 3-M-Oil Test | AATCC Water Spray-Test |
|---|---|---|
| Cotton [1] | 70 | 50 |
| Wool [1] | 70 | 50 |

[1] 2% copolymer on the fabric.

The so-treated cotton and wool are submitted to 3 times AATCC No. 3A wash tests and the reevaluation of the oil- and water-repellency still gives 60–70 in the 3-M-Oil Test and 50 in the AATTCC Water Spray Test for cotton and wool, indicating a good wash fastness and repellency fastness.

Example VII.—Poly(methacrylyl-N-methylperfluorooctanoylhydroxamate)

Methacrylyl - N-methylperfluorooctanoylhydroxamate (prepared by procedure C), 10 g., and 0.2 g. of azobisisobutyronitrile are sealed in an ampul under nitrogen. The polymerization and isolation of the polymer is carried out as described in Example I. The polymer has no distinct Tg-value, but a sharp M.P. at 126 to 128° C. As described in Example I, 2% by weight of the polymer is applied to cotton and to wool and the following repellency ratings were obtained:

| Fabric | 3-M-Oil Test | AATCC Water Spray Test |
|---|---|---|
| Cotton | 90 | 100 |
| Wool | 110 | 100 |

The free surface energe ($\delta c$) of a polymer film is 11.5 dynes/cm.

Example VIII.—Copolymers of methacrylyl-N-methylperfluorooctanoylhydroxamate and n-octyl methacrylate Copolymers of methacrylyl-N-methylperfluorooctanoylhydroxamate and n-octyl methacrylate are prepared as follows: 10 parts by weight of the monomer mixture and 0.2 parts of azobisisobutyronitrile are sealed in an ampul under nitrogen and polymerized for 15 hours at 80°. Then the ampul is opened, the copolymer is dissolved in 50 parts of benzotrifluoride and precipitated into 1000 parts of methanol. The dried copolymer is analyzed by C, H and F analysis. It is found that the copolymer composition is ±2% within the limits of the composition of the monomer mixture. 2% by weight of the copolymers, from a 2% solution in benzotrifluoride, is applied to cotton and wool as described in the previous example and the following repellency ratings are obtained.

| Copolymer Composition | | Repellency Ratings | | |
|---|---|---|---|---|
| Monomer Procedure C, Percent | n-Octylmethacrylate, Percent | Fabric | 3-M-Oil test | AATCC-Water Spray Test |
| 90 | 10 | Cotton | 80 | 80 |
|  |  | Wool | 100 | 90 |
| 77 | 23 | Cotton | 80 | 80 |
|  |  | Wool | 90 | 85 |
| 60 | 40 | Cotton | 70 | 70 |
|  |  | Wool | 80 | 80 |

Example IX.—Copolymers with soil repellent properties are obtained by copolymerizing the monomers of Procedure D with n-octyl methacrylate, according to the procedure of Example II.

Example X.—Copolymers with soil repellent properties are obtained by bulk or solution techniques according to the procedures of Examples I–IX or, where appropriate, by emulsion polymerization using an ammonium persulfate catalyst and sodium perfluorooctanoate as emulsifier and methacrylyl perfluorooctanoylhydroxamate, with one third part by weight based on the said hydroxamate, of the following comonomers:

ethylene
vinyl acetate
vinyl chloride
vinyl fluoride
vinylidene chloride
vinylidene fluoride
vinyl chloroacetate
acrylonitrile
vinylidene cyanide
styrene
vinyl toluene
p-chlorostyrene
methyl acrylate
methyl methacrylate
α-chloroacrylic acid
methacrylonitrile
acrylamide
methacrylamide
vinyl carbazole
vinyl pyrrolidone
vinyl pyridine
methyl vinyl ether
methyl vinyl ketone
butadiene chloroprene
fluoroprene and
isoprene
lauryl methacrylate
hexyl acrylate and
2-ethylhexyl acrylate

What is claimed is:

1. A copolymer having a skeletal chain comprising repeating units represented by the formula:

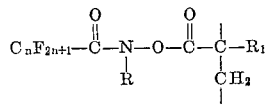

wherein $n$ is a whole number of from 1 to 18;
R is hydrogen or alkyl of from 1 to 6 carbon atoms; and
$R_1$ is hydrogen or methyl; and repeating units of at least one other ethylenically unsaturated monomer.

2. A copolymer of a compound as defined in claim 1 wherein $n$ is 7, R is hydrogen, $R_1$ is methyl and, as the comonomer, n-octyl methacrylate.

3. A copolymer of a compound as defined in claim 1 wherein $n$ is 7, R is hydrogen, $R_1$ is methyl and, as a first comonomer, n-octyl methacrylate and, as a second comonomer, 2-hydroxypropyl methacrylate.

4. A copolymer of a compound as defined in claim 1 wherein $n$ is 3, R is hydrogen, $R_1$ is methyl and, as the comonomer glycidyl methacrylate.

5. A copolymer of a compound as defined in claim 1 wherein $n$ is 7, and R and $R_1$ are methyl and, as the comonomer, octyl methacrylate.

6. Fabrics which have been coated with the copolymer as defined in claim 2 so as to have been rendered both water repellent and oil repellent.

7. Fabrics which have been coated with the copolymer as defined in claim 3 so as to have been rendered both water repellent and oil repellent.

8. Fabrics which have been coated with the copolymer as defined in claim 4 so as to have been rendered both water repellent and oil repellent.

9. Fabrics which have been coated with the copolymer as defined in claim 5 so as to have been rendered both water repellent and oil repellent.

10. A composition of matter comprising a blend of a copolymer of a compound as defined in claim 1 wherein $n$ is 7, R is hydrogen, $R_1$ is methyl and, as a first comonomer, n-octyl methacrylate, and as a second comonomer, 2-hydroxypropyl methacrylate and a copolymer of n-octyl methacrylate with methacrylic acid.

11. Fabrics which have been coated with the composition as defined in claim 10 so as to have been rendered both water repellent and oil repellent.

12. A polymer having a skeletal chain consisting essentially of repeating units represented by the formula:

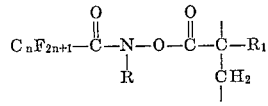

wherein $n$ is a whole number of from 1 to 18; R is hydrogen or alkyl of from 1 to 6 carbon atoms; and $R_1$ is hydrogen or methyl.

13. A polymer as defined in claim 12 wherein $n$ is 7, R is hydrogen and $R_1$ is methyl.

14. A polymer as defined in claim 12 wherein $n$ is 3, R is hydrogen and $R_1$ is methyl.

15. A polymer as defined in claim 12 wherein $n$ is 7, and R and $R_1$ are methyl.

16. Fabrics which have been coated with the polymers as defined in claim 12 so as to have been rendered both water repellent and oil repellent.

17. Fabrics which have been coated with the polymer as defined in claim 13 so as to have been rendered both water repellent and oil repellent.

18. Fabrics which have been coated with the polymer as defined in claim 14 so as to have been rendered both water repellent and oil repellent.

19. Fabrics which have been coated with the polymer as defined in claim 15 so as to have been rendered both water repellent and oil repellent.

References Cited

UNITED STATES PATENTS

| | | | |
|---|---|---|---|
| 3,304,278 | 2/1967 | Houptschein et al. | 260—86.1 |
| 3,192,261 | 6/1965 | Losee et al. | 260—545 |
| 3,213,135 | 9/1962 | Speziale et al. | 260—545 |
| 3,282,905 | 11/1966 | Fasick et al. | 260—900 |

MURRAY TILLMAN, *Primary Examiner.*

J. W. SNOW, *Assistant Examiner.*